US 8,648,572 B2

(12) United States Patent
Kiyohara et al.

(10) Patent No.: US 8,648,572 B2
(45) Date of Patent: Feb. 11, 2014

(54) PROTECTION CIRCUIT AND BATTERY PACK

(75) Inventors: Yoshikazu Kiyohara, Osaka (JP);
Toshiyuki Nakatsuji, Hyogo (JP);
Takahisa Otsu, Osaka (JP)

(73) Assignee: Panasonic Corporation, Osaka (JP)

( * ) Notice: Subject to any disclaimer, the term of this patent is extended or adjusted under 35 U.S.C. 154(b) by 261 days.

(21) Appl. No.: 13/058,267

(22) PCT Filed: Mar. 24, 2010

(86) PCT No.: PCT/JP2010/002053
§ 371 (c)(1),
(2), (4) Date: Feb. 9, 2011

(87) PCT Pub. No.: WO2010/116633
PCT Pub. Date: Oct. 14, 2010

(65) Prior Publication Data
US 2011/0133571 A1 Jun. 9, 2011

(30) Foreign Application Priority Data

Apr. 9, 2009 (JP) ................................ 2009-094745
Mar. 12, 2010 (JP) ................................ 2010-055559

(51) Int. Cl.
*H02J 7/00* (2006.01)
*H02H 3/00* (2006.01)

(52) U.S. Cl.
USPC .......................................... 320/134; 361/79

(58) Field of Classification Search
USPC .......... 320/118, 134, 136, 162, 164; 307/126, 307/130; 363/50, 56.03–56.12; 361/79
See application file for complete search history.

(56) References Cited

U.S. PATENT DOCUMENTS

| 7,782,638 | B2 * | 8/2010 | Murata et al. .............. 363/56.11 |
| 8,018,200 | B2 * | 9/2011 | Enjalbert et al. .............. 320/134 |
| 2011/0163723 | A1 * | 7/2011 | Tan et al. ....................... 320/134 |
| 2011/0267726 | A1 * | 11/2011 | Ikeuchi et al. .................. 361/63 |
| 2011/0273804 | A1 * | 11/2011 | Ikeuchi et al. .................. 361/63 |

FOREIGN PATENT DOCUMENTS

| CN | 1361571 A | 7/2002 |
| CN | 1393970 A | 1/2003 |
| JP | 2001-286068 | 10/2001 |
| JP | 2004-120849 | 4/2004 |
| JP | 2009-038854 | 2/2009 |

OTHER PUBLICATIONS

Chinese Office Action issued in the corresponding Chinese Patent Application No. 201080002272.5 on Jun. 5, 2013.

* cited by examiner

*Primary Examiner* — Richard V Muralidar
*Assistant Examiner* — Steve T Chung
(74) *Attorney, Agent, or Firm* — McDermott Will & Emery LLP

(57) ABSTRACT

A protection circuit having: a connecting terminal which is connected to an external circuit and which inputs and outputs a charging/discharging current of a secondary battery to and from the external circuit; a voltage detection unit for detecting an output voltage of the secondary battery; a current detection unit for detecting a discharging current of the secondary battery; a power consumption calculation unit for calculating power consumption of the external circuit by multiplying a value of the output voltage detected by the voltage detection unit by a value of the discharging current detected by the current detection unit; and an external protection unit for executing external protection processing of protecting the external circuit when the power consumption calculated by the power consumption calculation unit exceeds a power threshold set to a value that is not less than a maximum value of power consumption of the external circuit.

18 Claims, 10 Drawing Sheets

US 8,648,572 B2

PROTECTION CIRCUIT AND BATTERY PACK

RELATED APPLICATIONS

This application is the U.S. National Phase under 35 U.S.C. §371 of International Application No. PCT/JP2010/002053, filed on Mar. 24, 2010, which in turn claims the benefit of Japanese Application No. 2009-094745, filed on Apr. 9, 2009 and Japanese Application No. 2010-055559, filed on Mar. 12, 2010, the disclosures of which Applications are incorporated by reference herein.

TECHNICAL FIELD

The present invention relates to a protection circuit for protecting a circuit which receives the supply of power from a secondary battery, and to a battery pack having such a protection circuit.

BACKGROUND ART

Conventionally, known is a battery pack with a built-in overcurrent protection circuit for protecting the battery from an overcurrent by detecting the current flowing to the battery and, if the current becomes greater than the setting current, turning OFF the semiconductor switching element that is connected to the battery in series and blocking the current (for example, refer to Patent Document 1).

Meanwhile, with respect to the power consumption of a load circuit in electrical equipment that operate by receiving a power supply from the battery pack; for instance, electronic devices such as portable personal computers, digital cameras and cell phones, and vehicles such as electrical vehicles and hybrid cars, its maximum value is specified, and the battery pack is designed to enable the supply of such maximum power consumption.

Specifically, for example, when using a lithium ion secondary battery with the output voltage per cell being within the range of 3.5 V to 4.2 V, even if the output current value is the same, the output power will decrease as the output voltage becomes lower. Thus, with a battery pack, if the current flowing to the secondary battery; that is, if the output current of the secondary battery becomes greater than the setting current, the current is blocked so as to protect the secondary battery from an overcurrent.

Accordingly, the protection circuit of a secondary battery is set with a setting current for protection from an overcurrent to enable the supply of the maximum power consumption required by the electrical equipment in the available output voltage lower limit value.

Meanwhile, if an abnormality such as a short circuit malfunction occurs in the load circuit that receives the power supply from the secondary battery, there are cases where the power consumption of the load circuit; that is, the output power of the secondary battery increases and exceeds the specified maximum power consumption. In the foregoing case, if supply of power to the load circuit is continued, the load circuit may generate heat.

Nevertheless, as described above, with the method of blocking the current in cases where the output current of the secondary battery becomes greater than the setting current, if the output voltage of the secondary battery is low, the output current will exceed the setting current as a result of the power consumption of the load circuit exceeding the specified maximum power consumption, and it is thereby possible to block the power supply. However, if the output voltage of the secondary battery is high, even if the output current falls below the setting current, there are cases where the output power of the secondary battery exceeds the specified maximum power consumption.

Thus, with the method of blocking the current in cases where the output current of the secondary battery becomes greater than the setting current, there is a drawback in that it is difficult to protect the load circuit in cases where an abnormality occurs in the power consumption of the load circuit that receives the power supply from the secondary battery.

Patent Document 1: Japanese Patent Application Publication No. 2001-286068

SUMMARY OF THE INVENTION

An object of this invention is to provide a protection circuit capable of protecting the load circuit regardless of the output voltage of the secondary battery in cases where an abnormality occurs in the power consumption of the load circuit, and a battery pack comprising such a protection circuit.

Specifically, the protection circuit according to one aspect of the present invention has: a connecting terminal which is connected to an external circuit and which inputs and outputs a charging/discharging current of a secondary battery to and from the external circuit; a voltage detection unit for detecting an output voltage of the secondary battery; a current detection unit for detecting a discharging current of the secondary battery; a power consumption calculation unit for calculating power consumption of the external circuit by multiplying a value of the output voltage detected by the voltage detection unit by a value of the discharging current detected by the current detection unit; and an external protection unit for executing external protection processing of protecting the external circuit when the power consumption calculated by the power consumption calculation unit exceeds a power threshold set to a value that is not less than a maximum value of the power consumption of the external circuit.

Moreover, the battery pack according to one aspect of the present invention comprises the foregoing protection circuit, and the secondary battery.

DESCRIPTION OF EMBODIMENTS

Figure 1:
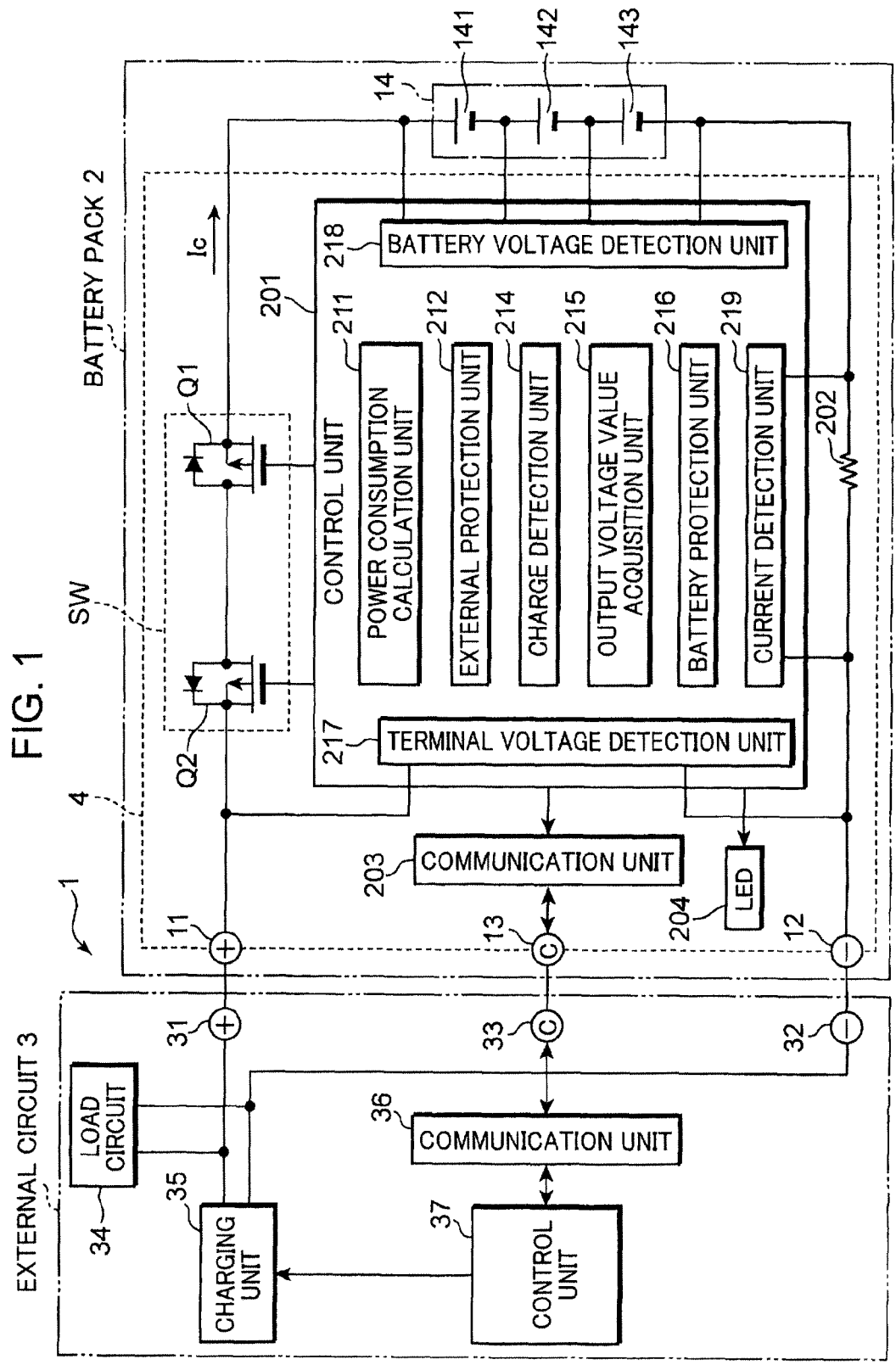
FIG. 1 is a block diagram showing an example of the configuration of a battery pack comprising the protection circuit according to the first embodiment of the present invention.

Embodiments of the present invention are now explained with reference to the attached drawings. Note that the same constituent elements in the respective drawings are given the same reference numeral, and the explanation thereof is omitted.

First Embodiment

FIG. 1 is a block diagram showing an example of the configuration of a battery pack 2 comprising a protection circuit 4 according to the first embodiment of the present invention. A charging system 1 shown in FIG. 1 is configured by combining the battery pack 2 and an external circuit 3.

The charging system 1 is, for example, a battery-mounted device or system of various electronic devices such as portable personal computers, digital cameras and cell phones, and vehicles such as electrical vehicles and hybrid cars. The external circuit 3 is, for example, the main body of the foregoing battery-mounted device or system, and the load circuit 34 is the load circuit which operates based on the power supply from the battery pack 2 in the foregoing battery-mounted device or system.

With the load circuit 34, the maximum value of power consumption during normal operation is specified in advance as maximum power consumption Pmax, and is configured so that the power consumption does not exceed the maximum power consumption Pmax.

The charging unit 35 may be, for example, a power circuit for generating a charging current of the battery pack 2 from a commercial power voltage, or a power generator that generates energy based on natural energy such as solar light, wind power or water power, or a power generator that generates energy based on the power of an internal combustion engine or the like.

The battery pack 2 comprises a protection circuit 4, and an assembled battery 14 (secondary battery). Moreover, the protection circuit 4 comprises connecting terminals 11, 12, 13, a control unit 201, a current sensing resistor 202, a communication unit 203, an LED (Light Emitting Diode) 204 (alarm unit), a discharge switching element Q1, and a charge switching element Q2.

Note that the charging system 1 does not necessarily have to be configured so that it can be separated into the battery pack 2 and the external circuit 3, and one protection circuit 4 may be configured from the overall charging system 1. Moreover, the battery pack 2 and the external circuit 3 may jointly comprise the protection circuit 4 in a divided manner. In addition, the assembled battery 14 does not need to be configured in the form of a battery pack, and, for example, the protection circuit 4 may also be configured as an in-car ECU (Electric Control Unit).

The external circuit 3 comprises connecting terminals 31, 32, 33, a load circuit 34, a charging unit 35, a communication unit 36, and a control unit 37. The charging unit 35 is connected to the power-feeding connecting terminals 31, 32, and the communication unit 36 is connected to the connecting terminal 33.

Moreover, when the battery pack 2 is mounted on the external circuit 3, the connecting terminals 11, 12, 13 of the battery pack 2 and the connecting terminals 31, 32, 33 of the external circuit 3 become respectively connected.

The communication units 203, 36 are communication interface circuits which are configured to enable mutual data transmission and reception via the connecting terminals 13, 33. The charging unit 35 is a power circuit for supplying the current and voltage to the battery pack 2 via the connecting terminals 31, 32 according to the control signal from the control unit 37.

The control unit 37 is a control circuit that is configured, for example, using a microcomputer. When a request command sent from the control unit 201 to the communication unit 203 in the battery pack 2 is received by the communication unit 36, the control unit 37 controls the charging unit 35 according to the request command received by the communication unit 36 in order to output the current or voltage from the charging unit 35 to the connecting terminals 11, 12 according to the request command sent from the battery pack 2.

Moreover, if the request command from the control unit 201 is, for example, a request for a constant voltage Vf to perform a constant voltage charge, the control unit 37 causes the charging unit 35 to output the voltage Vf between the connecting terminals 11, 12.

Furthermore, even if the voltage Vf is requested from the control unit 201, the control unit 37 controls the current so that the charging/discharging current value Ic of the current output from the charging unit 35 will not exceed the pre-set limited current value Ip for protecting the assembled battery 14 from an overcurrent. In the foregoing case, if the charging/discharging current value Ic reaches the limited current value Ip, there are cases where current control is given preference and the voltage applied between the connecting terminals 11, 12 falls below the voltage Vf.

The control unit 37 additionally sends information showing the maximum power consumption Pmax of the load circuit 34 to the battery pack 2 via the communication unit 36.

In addition, if the information showing that an abnormality has occurred in the load circuit 34 is received by the communication unit 36, the control unit 37 causes, for example, the power control circuit (not shown) for controlling the power supply of the load circuit 34 to execute the protection operation of the load circuit 34 based on processing such as turning OFF the power of the load circuit 34.

In the battery pack 2, the connecting terminal 11 is connected to the positive electrode of the assembled battery 14 via the charge switching element Q2 and the discharge switching element Q1 to be used for discharge. For example, a p-channel FET (Field Effect Transistor) is used as the discharge switching element Q1 and the charge switching element Q2. In addition, the switching unit SW is configured from a series circuit of the discharge switching element Q1 and the charge switching element Q2.

The discharge switching element Q1 is configured such that the cathode of a parasitic diode is directed toward the assembled battery 14, and blocks only the current in the discharging direction of the assembled battery 14 when it is turned OFF. Moreover, the charge switching element Q2 is configured such that the cathode of a parasitic diode is directed toward the connecting terminal 11, and blocks only the current in the charging direction of the assembled battery 14 when it is turned OFF.

Moreover, the connecting terminal 12 is connected to the negative electrode of the assembled battery 14 via the current sensing resistor 202, and a current path from the connecting terminal 11 to the connecting terminal 12 is configured via the charge switching element Q2, the discharge switching element Q1, the assembled battery 14, and the current sensing resistor 202.

Note that the connecting terminals 11, 12, 13, 31, 32, 33 will suffice so as long as they are able to connect electrically with the battery pack 2 and the external circuit 3, and may be, for example, electrodes, connectors or terminal blocks, or may be wiring patterns such as lands or pads.

The current sensing resistor 202 converts the charging current and the discharging current of the assembled battery 14 into a voltage value.

The assembled battery 14 is configured, for example, by a plurality of secondary batteries 141, 142, 143 being connected in series. Note that the assembled battery 14 may also be a cell or the like, or an assembled battery in which a plurality of secondary batteries are connected in parallel, or an assembled battery in which a plurality of secondary batteries are combined and connected in series and in parallel. Various secondary batteries such as lithium ion secondary batteries and nickel hydride secondary batteries may be used as the secondary batteries 141, 142, 143.

If the secondary batteries 141, 142, 143 are a unit cell of a lithium ion secondary battery, 4.2 V×3=12.6 V is used as the voltage Vf for use in the foregoing constant voltage charge so that it will be approximately 4.2 V per cell.

In the foregoing case, the secondary batteries 141, 142, 143, and the assembled battery 14 respectively correspond to an example of the secondary battery in the claims.

The control unit 201 is configured by comprising, for example, a CPU (Central Processing Unit) for executing predetermined arithmetic processing, a ROM (Read Only Memory) storing predetermined control programs, a RAM (Random Access Memory) for temporarily storing data, an A/D conversion circuit, and peripheral circuits thereof.

As a result of executing the control programs stored in the ROM, the control unit 201 functions as the power consumption calculation unit 211, the external protection unit 212, the charge detection unit 214, the output voltage value acquisition unit 215, the battery protection unit 216, the terminal voltage detection unit 217 (voltage detection unit), the battery voltage detection unit 218 (voltage detection unit), and the current detection unit 219.

The terminal voltage detection unit 217 is configured, for example, by using the A/D conversion circuit, and detects the terminal voltage Vt between the connecting terminals 11, 12.

The battery voltage detection unit 218 is configured, for example, by using the A/D conversion circuit, and detects the respective terminal voltages V1, V2, V3 of the secondary batteries 141, 142, 143. The battery voltage detection unit 218 acquires the total voltage of the respective terminal voltages V1, V2, V3 as the battery voltage Vb, which is the terminal voltage of the assembled battery 14. Note that the battery voltage detection unit 218 may also be configured to directly detect the terminal voltage of the assembled battery 14 as the battery voltage Vb.

The current detection unit 219 is configured, for example, by using the A/D conversion circuit, and acquires the charging/discharging current value Ic flowing to the assembled battery 14 by detecting the voltage Vr between both ends of the current sensing resistor 202 and diving such voltage Vr by the resistance value R of the current sensing resistor 202. Moreover, the current detection unit 219 is configured to indicate, with respect to the charging/discharging current value Ic, for example, the current value in the direction of charging the assembled battery 14 as a positive value and the current value in the direction of charging the assembled battery 14 as a negative value.

The power consumption calculation unit 211 calculates the power consumption P of the external circuit 3 by multiplying the terminal voltage Vt (output voltage) detected by the terminal voltage detection unit 217 and the charging/discharging current value Ic detected by the current detection unit 219 when current of a discharging direction is flowing to the assembled battery 14.

Note that the power consumption calculation unit 211 may also calculate the power consumption P of the external circuit 3 by multiplying the battery voltage Vb (output voltage) acquired with the battery voltage detection unit 218 and the charging/discharging current value Ic detected by the current detection unit 219. In the foregoing case, the configuration may omit the terminal voltage detection unit 217. Nevertheless, since the power loss that arose in the switching unit SW is included in the power consumption P if the power consumption P is calculated by multiplying the battery voltage Vb and the charging/discharging current value Ic, the calculation accuracy of the power consumption P will improve if the power consumption P is calculated by multiplying the terminal voltage Vt and the charging/discharging current value Ic.

The external protection unit 212 acquires the maximum power consumption Pmax by causing the communication unit 203 to receive information showing the maximum power consumption Pmax sent from the control unit 37. Note that the maximum power consumption Pmax may also be stored in advance, for example, in the ROM.

If the power consumption P calculated by the power consumption calculation unit 211 exceeds the maximum power consumption Pmax, since it is considered that some kind of abnormality has occurred in the external circuit 3, the external protection unit 212 executes the external protection processing of, for example, turning OFF the discharge switching element Q1 to block the power supply to the external circuit 3, or causing the communication unit 203 to send information showing that an abnormality has occurred in the external circuit 3 to the external circuit 3 so as to cause the control unit 37 in the external circuit 3 to execute the protection operation of the load circuit 34. In the foregoing case, the maximum power consumption Pmax corresponds to an example of the power threshold.

Note that the external protection unit 212 may also be configured to compare, in substitute for the maximum power consumption Pmax, the power threshold, which is set to a value that is greater than the maximum power consumption Pmax, and the power consumption P.

Moreover, if the power consumption P calculated by the power consumption calculation unit 211 exceeds the maximum power consumption Pmax, the external protection unit 212 notifies the user that an abnormality has occurred in the external circuit 3, for example, by lighting up the LED 204. Note that the alarm unit is not limited to an LED, and, for example, may also be an LCD display or a configuration which notifies the occurrence of an abnormality with sound such as a buzzer.

The charge detection unit 214 detects that a current in the charging direction has started to flow to the assembled battery 14. Specifically, the charge detection unit 214 determines that the current in the charging direction has started to flow to the assembled battery 14, for example, if the charging/discharging current value Ic detected by the current detection unit 219 increases in the positive direction from zero or changes from negative to positive.

If the charge detection unit 214 detects that a charging current has started to flow to the assembled battery 14, the output voltage value acquisition unit 215 turns OFF the discharge switching element Q1 and the charge switching element Q2, causes the terminal voltage detection unit 217 to detect the terminal voltage Vt between the connecting terminals 11, 12, and acquires the terminal voltage Vt obtained as described above as the output voltage value Vout of the charging unit 35.

In cases where the charge detection unit 214 detects that a charging current has started to flow to the assembled battery 14, the battery protection unit 216 turns ON the discharge switching element Q1 and the charge switching element Q2 if the output voltage value Vout acquired by the output voltage value acquisition unit 215 is less than the pre-set determination voltage Vth on the one hand, and turns OFF the charge switching element Q2 and turns ON the discharge switching element Q1 to realize a charge disabled state if the output voltage value Vout exceeds the determination voltage Vth.

A voltage value that exceeds the upper limit value of the voltage output from the charging unit 35 in cases where the charging unit 35 is operating normally is set as the determination voltage Vth.

For example, if the secondary batteries 141, 142, 143 are lithium ion secondary batteries and 12.6 V is set as the voltage Vf, since the upper limit of the voltage output from the charging unit 35 will be 12.6 V if the charging unit 35 is operating normally, as the determination voltage Vth, for example, 15 V which exceeds 12.6 V is set.

Moreover, the battery protection unit 216 turns ON the charge switching element if a discharging current flows to the assembled battery 14 during the foregoing charge disabled state.

Note that, in cases where the charge detection unit 214 detects that a charging current has started to flow to the assembled battery 14, the battery protection unit 216 may also turn ON the discharge switching element Q1 and the charge switching element Q2 if the output voltage value Vout acquired by the output voltage value acquisition unit 215 is less than the determination voltage Vth, and maintain a state of turning OFF the discharge switching element Q1 and the charge switching element Q2 if the output voltage value Vout exceeds the determination voltage Vth.

In addition, the battery protection unit 216 is also configured to prevent an overcharge by turning OFF the charge switching element Q2 if the respective terminal voltages V1, V2, V3 of the secondary batteries 141, 142, 143 detected by the battery voltage detection unit 218 exceeds the pre-set overcharge voltage for preventing the overcharge of the secondary batteries 141, 142, 143, and to prevent an overdischarge by turning OFF the discharge switching element Q1 if the respective terminal voltages V1, V2, V3 of the secondary batteries 141, 142, 143 fall below the pre-set overdischarge voltage for preventing the overdischarge of the secondary batteries 141, 142, 143.

Figure 2:
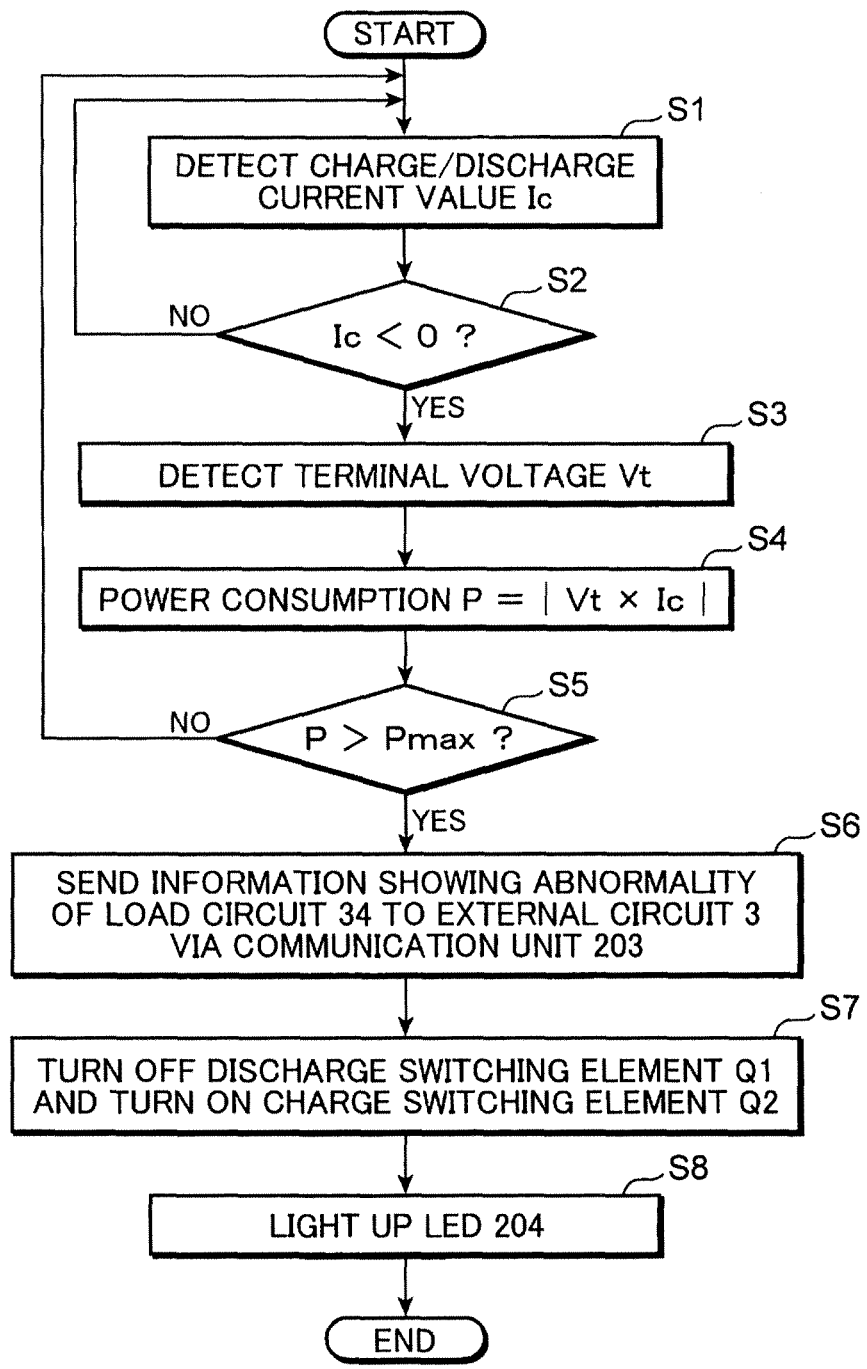
FIG. 2 is a flowchart showing an example of the operation of the battery pack depicted in FIG. 1.
Figure 3:
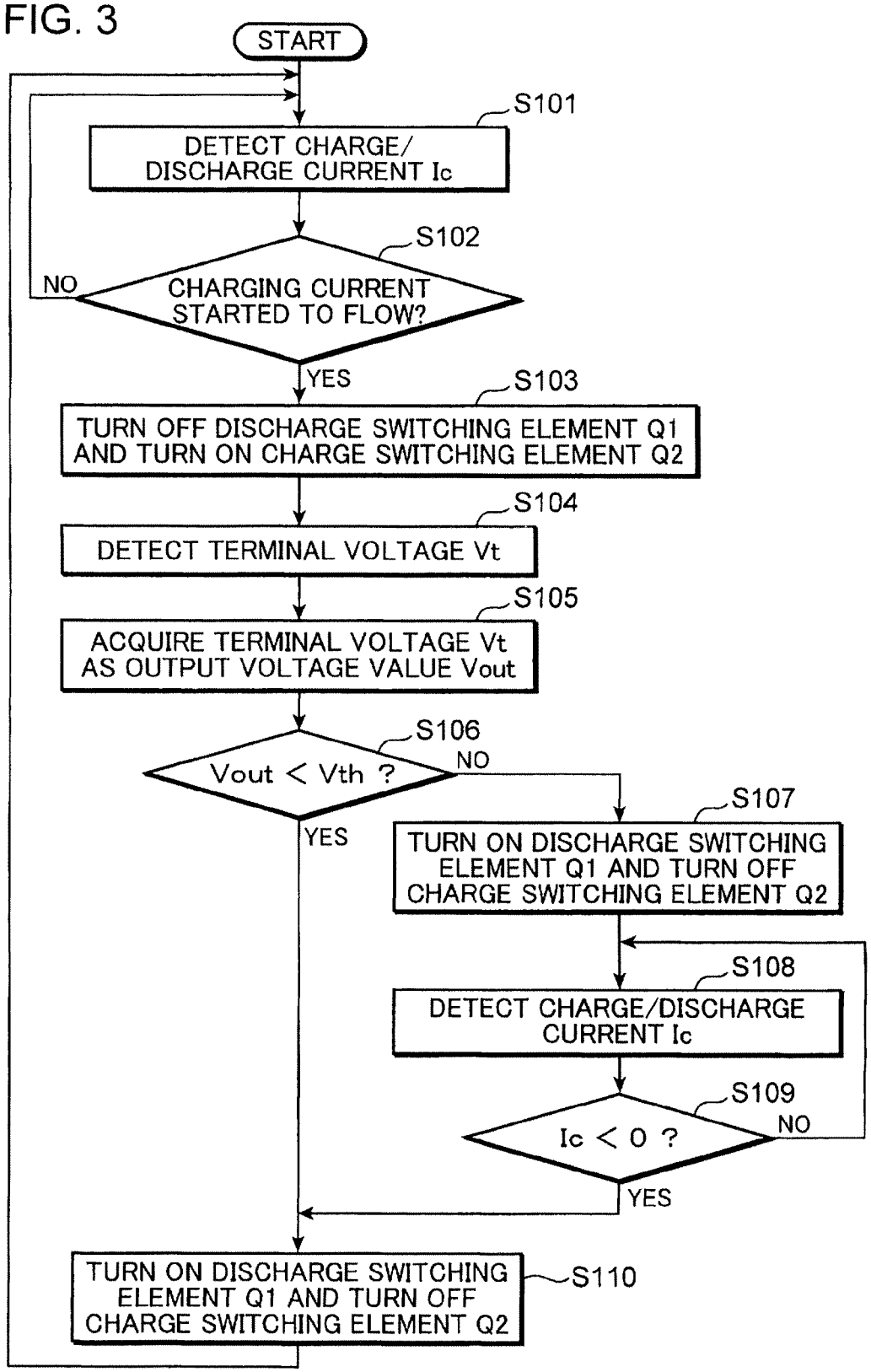
FIG. 3 is a flowchart showing an example of the operation of the battery pack depicted in FIG. 1.

The operation of the charging system 1 configured as described above is now explained. FIG. 2 and FIG. 3 are flowcharts showing an example of the operation of the battery pack 2 shown in FIG. 1. FIG. 2 primarily shows an example of the operation of the power consumption calculation unit 211 and the external protection unit 212. Moreover, FIG. 3 primarily shows an example of the operation of the charge detection unit 214, the output voltage value acquisition unit 215, and the battery protection unit 216. The flowchart shown in FIG. 2 and the flowchart shown in FIG. 3 are executed in parallel.

The flowchart shown in FIG. 2 is foremost explained. Foremost, the current detection unit 219 detects the charging/discharging current value Ic flowing to the assembled battery 14 (step S1).

Subsequently, the power consumption calculation unit 211 confirms whether the charging/discharging current value Ic is smaller than zero; that is, whether the current flowing to the assembled battery 14 is flowing in a discharging direction (step S2). If the charging/discharging current value Ic is smaller than zero and therefore the current flowing to the assembled battery 14 is flowing in a discharging direction (YES at step S2), the terminal voltage detection unit 217 detects the terminal voltage Vt between the connecting terminals 11, 12 (step S3).

Subsequently, the power consumption calculation unit 211 multiplies the terminal voltage Vt and the charging/discharging current value Ic, and the absolute value thereof is calculated as the power consumption P (step S4). The external protection unit 212 compares the power consumption P and the maximum power consumption Pmax (step S5), and, if the power consumption P is not greater than the maximum power consumption Pmax (NO at step S5), since this means that the power consumption P is a normal value, steps S1 to S5 are repeated.

Meanwhile, if the power consumption P exceeds the maximum power consumption Pmax (YES at step S5), since it is considered that an abnormality such as a short circuit malfunction has occurred in the load circuit 34, the external protection unit 212 sends information showing that an abnormality has occurred in the external circuit 3 to the external circuit 3 via the communication unit 203 in order to cause the control unit 37 in the external circuit 3 to execute the protection operation of the load circuit 34 (step S6), and the external protection unit 212 thereafter turns OFF the discharge switching element Q1 and blocks the power supply to the external circuit 3 so as to protect the load circuit 34 (step S7).

Note that the configuration may be such that step S6 is not executed.

Moreover, if the power consumption P exceeds the maximum power consumption Pmax at step S7, the external protection unit 212 can also block the power supply to the external circuit 3 by turning OFF both the discharge switching element Q1 and the charge switching element Q2.

Nevertheless, if only the discharge switching element Q1 is turned OFF when the power consumption P exceeds the maximum power consumption Pmax, since the charging current is not blocked, it is possible to stop the power supply to the load circuit 34 which is considered to be subject to an abnormality, and, if there is any surplus in the amount of power generated with the power generator, promptly charge the assembled battery 14 using such excess power at the same time.

In addition, if the power consumption P calculated by the power consumption calculation unit 211 exceeds the maximum power consumption Pmax, the external protection unit 212 notifies the user that an abnormality has occurred in the external circuit 3 by, for example, lighting up the LED 204 (step S8), and then ends the processing.

Note that the configuration may be such that step S8 is not executed.

According to the foregoing processing of steps S1 to S8, with the battery pack 2 comprising the protection circuit 4, since the external circuit 3 is protected when the power consumption P calculated by the power consumption calculation unit 211 exceeds the maximum power consumption Pmax; that is, when it is considered that some kind of abnormality has occurred in the external circuit 3, the external circuit can be protected regardless of the output voltage of the assembled battery 14.

The operation of the charge detection unit 214, the output voltage value acquisition unit 215, and the battery protection unit 216 is now explained with reference to FIG. 3. The operation of steps S101 to S110 shown in FIG. 3 is executed in parallel to steps S1 to S8 shown in FIG. 2.

Foremost, the current detection unit 219 detects the charging/discharging current value Ic flowing to the assembled battery 14 (step S101).

Subsequently, the charge detection unit 214 confirms whether a charging current started to flow to the assembly battery 14; that is, whether the charging of the assembled battery 14 has started based on the charging/discharging current value Ic detected by the current detection unit 219 (step S102). If the charge detection unit 214 detects that a charging current has started to flow to the assembled battery 14 (YES at step S102), the output voltage value acquisition unit 215 turns OFF the discharge switching element Q1 and the charge switching element Q2 (step S103).

Subsequently, the terminal voltage detection unit 217 detects the terminal voltage Vt (step S104). The output voltage value acquisition unit 215 acquires the terminal voltage Vt detected by the terminal voltage detection unit 217 as the output voltage value Vout (step S105).

In addition, the battery protection unit 216 compares the output voltage value Vout and the determination voltage Vth (step S106), and, if the output voltage value Vout is less than the determination voltage Vth (YES at step S106), the discharge switching element Q1 and the charge switching element Q2 are turned ON since it is considered that a charging voltage is being normally output from the charging unit 35 (step S110), and a charge/discharge enabled state is realized.

Meanwhile, if the output voltage value Vout is not less than the determination voltage Vth (NO at step S106), since it is considered that an abnormality has occurred in the charging unit 35 as a result of a voltage exceeding the upper limit value of the voltage output in a state where the charging unit 35 is operating normally is output from the charging unit 35, the discharge switching element Q1 is turned ON and the charge switching element Q2 is turned OFF (step S107), and a charge disabled state is realized.

It is thereby possible to reduce the possibility of the assembled battery 14 deteriorating as a result of an overvoltage being applied thereto. Moreover, since the discharge switching element Q1 is turned ON, if the output voltage of the charging unit 35 drops and becomes lower than the battery voltage Vb of the assembled battery 14, the assembled battery 14 can be discharged for supplying a load current to the load circuit 34.

Note that at step S107, the discharge switching element Q1 and the charge switching element Q2 may be maintained in an OFF state.

Here, assuming that the charge switching element Q2 is not turned OFF and the charge switching element Q2 is kept ON at step S103 and the terminal voltage Vt is detected at step S104, even in cases where the charging unit 35 is attempting to output the voltage Vf for performing the constant voltage charge, since the current output from the charging unit 35 will flow to the assembled battery 14, the charging/discharging current value Ic will exceed the limited current value Ip and the terminal voltage Vt will drop as a result of the current control being given preference, and there are cases where the terminal voltage Vt becomes lower than the voltage that the charging unit 35 is attempting to output as the voltage Vf.

Meanwhile, for example, there are cases where the charging unit 35 outputs 15 V as the voltage Vf due to the malfunction or the like of the charging unit 35 when in fact the charging unit 35 should be outputting 12.6 V as the voltage Vf. In the foregoing case, at step S106, the objective is to detect the abnormality of the charging unit 35 as a result of the output voltage of the charging unit 35 exceeding the determination voltage Vth. However, as described above, if the current output from the charging unit 35 flows to the assembled battery 14 and the terminal voltage Vt becomes lower than the voltage that the charging unit 35 is attempting to output as the voltage Vf, it is not possible to detect the abnormality of the charging unit 35.

Thus, by turning OFF the charge switching element Q2 to block the current flowing to the assembled battery 14 at step S103, and detecting the terminal voltage Vt as the output voltage value Vout at step S104, since the voltage that the charging unit 35 is attempting to output as the voltage Vf can be detected as the output voltage value Vout, it is possible to property determine the existence of any abnormality of the charging unit 35 at step S106.

Moreover, assuming that the discharge switching element Q1 is not turned OFF and the discharge switching element Q1 is kept ON at step S103 and the terminal voltage Vt is detected at step S104, there is a possibility that the output voltage of the assembled battery 14 goes around and reaches the connecting terminals 11, 12, and the detection accuracy of the output voltage value Vout may deteriorate.

Thus, by turning OFF the discharge switching element Q1 at step S103 to block the voltage from going around from the assembled battery 14 and reaching the connecting terminals 11, 12, the detection accuracy of the output voltage value Vout is thereby improved.

Subsequently, the current detection unit 219 detects the charging/discharging current value Ic flowing to the assembled battery 14 (step S108).

If the charging/discharging current value Ic detected by the current detection unit 219 is zero or more (NO at step S109), the battery protection unit 216 repeats steps S108 to S109 and maintains the charge switching element Q2 in an OFF state on the one hand, and, if the charging/discharging current value Ic detected by the current detection unit 219 becomes a negative value; that is, if it becomes a current value in a discharging direction (YES at step S109), proceeds to step S110 since it is considered that the possibility of an overvoltage being applied to the charging unit 35 has been resolved, and the discharge switching element Q1 and the charge switching element Q2 are turned ON (step S110), and a charge/discharge enabled state is realized.

The operation of steps S101 to S110 is thereafter repeated. As a result of foregoing steps S101 to S110 being executed in parallel with steps S1 to S8, it is possible to reduce the possibility of an overvoltage being applied to the assembled battery 14 due to a malfunction or the like when the charging unit 35 starts charging the assembled battery 14.

Note that, in the parallel operation of steps S1 to S8 and steps S101 to S110, if the ON/OFF control of the discharge switching element Q1 and the charge switching element Q2 is in conflict, the OFF operation will prevail. Specifically, among the process of steps S1 to S8 and the process of steps S101 to S110, the switching element that is turned OFF based on one process will not be turned ON based on the other process.

Moreover, the terminal voltage detection unit 217 for detecting the terminal voltage Vt at step S104 is also used for detecting the terminal voltage Vt used for calculating the switch voltage value Vsw at step S1, and there is no need to newly add a terminal voltage detection unit 217, which requires an expensive voltage detection circuit such as an A/D converter, only for the purpose of executing the battery protection based on steps S101 to S110.

Thus, in the configuration of executing the processing of steps S1 to S8, for example, the battery protection based on steps S101 to S110 can be realized merely by adding a control program to be stored in the ROM, and, therefore, it is possible to reduce costs for performing this kind of battery protection.

Second Embodiment

Figure 4:
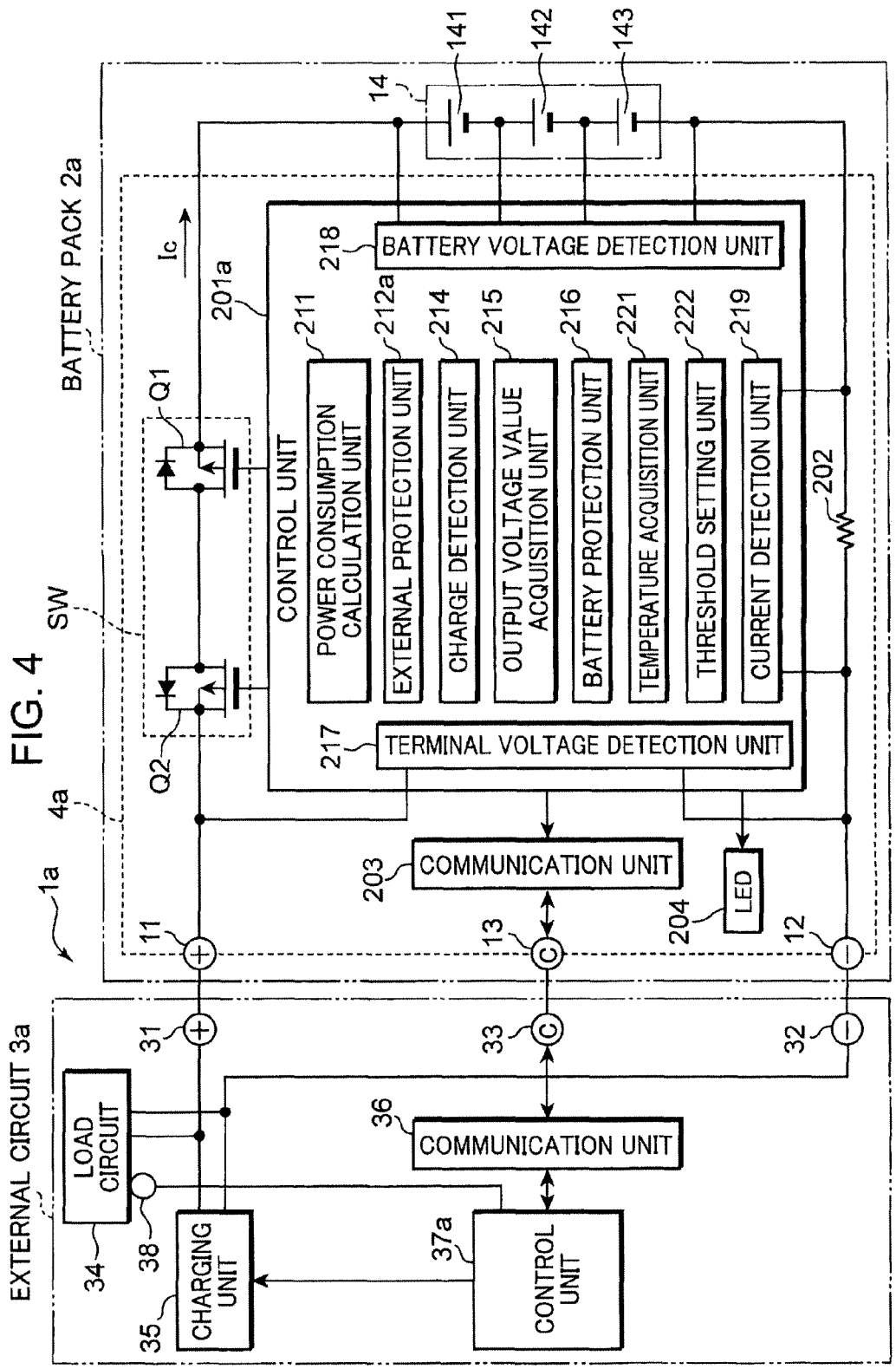
FIG. 4 is a block diagram showing an example of the protection circuit according to the second embodiment of the present invention, and a battery pack and a charging system comprising such protection circuit.

A protection circuit 4a and a battery pack 2a comprising the same according to the second embodiment of the present invention are now explained. FIG. 4 is a block diagram showing an example of the protection circuit 4a according to the second embodiment of the present invention, and the battery pack 2a and a charging system 1a comprising such a protection circuit 4a.

The protection circuit 4a shown in FIG. 4 differs from the protection circuit 4 shown in FIG. 1 with respect to the point that the control unit 201a comprises an external protection unit 212a in substitute for the external protection unit 212, and further comprises a temperature acquisition unit 221 and a threshold setting unit 222.

Moreover, the external circuit 3a shown in FIG. 4 differs from the external circuit 3 shown in FIG. 1 in that it further comprises a temperature sensor 38, and that the operation of the control unit 37a is different.

Since the remaining configuration is the same as the charging system 1 shown in FIG. 1, the explanation thereof is omitted, and the characteristic points of this embodiment are explained below.

The temperature sensor 38 is a temperature sensor that is configured, for example, using a thermistor or a thermocouple. The temperature sensor 38 is disposed, for example, near the load circuit 34 or adjacent to the load circuit 34 and detects the temperature t of the load circuit 34.

The control unit 37a differs from the control unit 37 with respect to the point that it sends temperature information showing the temperature t detected by the temperature sensor 38 to the battery pack 2a via the communication unit 36.

The temperature acquisition unit 221 acquires the temperature information sent from the control unit 37a to the communication unit 203 via the communication unit 36. Note that the temperature acquisition unit 221 is not necessarily limited to the case of acquiring the temperature information sent from the control unit 37a. For example, the temperature sensor 38 may be provided to the battery pack 2a, and the temperature acquisition unit 221 may acquire the temperature t detected by the temperature sensor 38 as the temperature information. Moreover, since the outside temperature and the temperature of the load circuit 34 are correlated, the temperature sensor may detect the outside temperature as the temperature t and the temperature acquisition unit 221 may acquire such temperature t as the temperature information.

The threshold setting unit 222 sets the power threshold Pth so that the power threshold Pth becomes a smaller value as the temperature t acquired by the temperature acquisition unit 221 increases. In the load circuit 34, the rise in temperature due to the heating value according to the power consumption in the load circuit 34 is added on to the current temperature t, and the temperature t of the load circuit 34 will increase.

Thus, as a result of the threshold setting unit 222 setting the power threshold Pth so that the power threshold Pth is not less than the maximum power consumption Pmax and becomes a smaller value as the temperature t rises, it is possible to set a power threshold Pth which enables the temperature t after the load circuit 34 generates heat to be a specified temperature tmax or less regardless of the current temperature t. As the specified temperature tmax, for example, an upper limit value such as a rated temperature in which the load circuit 34 can operate normally is used.

The external protection unit 212a differs from the external protection unit 212 with respect to the following points; namely, performing the abnormality notification processing of notifying the external circuit 3a that the power consumption P has exceeded the power threshold Pth separate from sending information showing that an abnormality has occurred as the external protection processing (step S6), and the conditions of executing the external protection processing.

Specifically, if the power consumption P exceeds the power threshold Pth, the external protection unit 212a notifies the external circuit 3a that the power consumption P has exceeded the power threshold Pth, further calculates excess power Po by integrating, during a pre-set determination continuation time Tj, a difference between the power consumption P and the power threshold Pth when the power consumption P calculated by the power consumption calculation unit 211 exceeds the power threshold Pth set with the threshold setting unit 222, and executes the foregoing external protection processing (steps S6 and S7) if the excess power Po exceeds a pre-set determination threshold Poj.

The heating value (Wh) of the load circuit 34 is obtained by multiplying the power (W) and time (h). Accordingly, even in cases where the power consumption P of the load circuit 34 temporarily exceeds the power threshold Pth, if the exceeding time is short, the heating value will be small and will not exceed the specified temperature tmax. Thus, the heating value which will cause the temperature t of the load circuit 34 to rise to the specified temperature tmax is pre-set as the determination threshold Poj.

It is thereby possible to reduce the possibility of stopping the power supply to the load circuit 34 due to the temporary increase of the power consumption even though the temperature t is less than the specified temperature tmax and the load circuit 34 is still able to operate normally, and further reduce the possibility of stopping the operation of the load circuit 34 as a result of the power supply being stopped.

Moreover, if the determination continuation time Tj is too short, the external protection processing will not be executed unless considerably power that will raise the temperature t of the load circuit 34 to the specified temperature tmax in a short period of time is consumed, and there is a possibility that the load circuit 34 cannot be appropriately protected. Meanwhile, if the determination continuation time Tj is too long, there is a possibility that consideration will be given to the heating value of far in the past which will not affect the current temperature t, and unnecessary external protection processing may be executed.

Accordingly, the determination continuation time Tj is suitably set by experimentally setting the time where protection can be performed so that the temperature t of the load circuit 34 will not exceed the specified temperature tmax.

Note that the threshold setting unit 222 may set the determination threshold Poj in substitute for the power threshold Pth. The threshold setting unit 222 may also set the determination threshold Poj so that the determination threshold Poj becomes a smaller value as the temperature t rises, and thereby set a determination threshold Poj of maintaining the temperature t of the load circuit 34 generates heat to be a constant specified temperature tmax or less regardless of the current temperature t.

Figure 5:
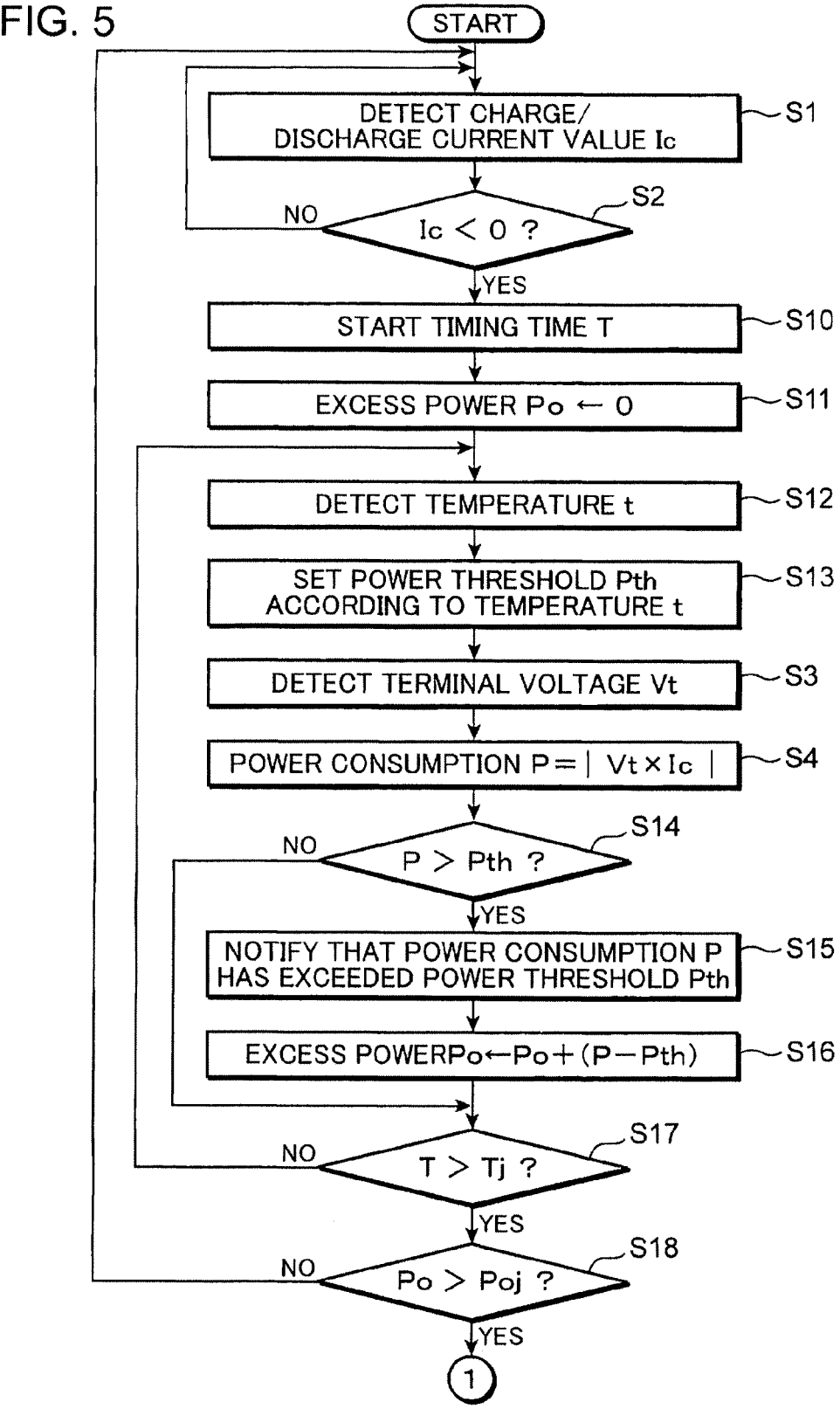
FIG. 5 is a flowchart showing an example of the operation of the protection circuit depicted in FIG. 1.
Figure 6:
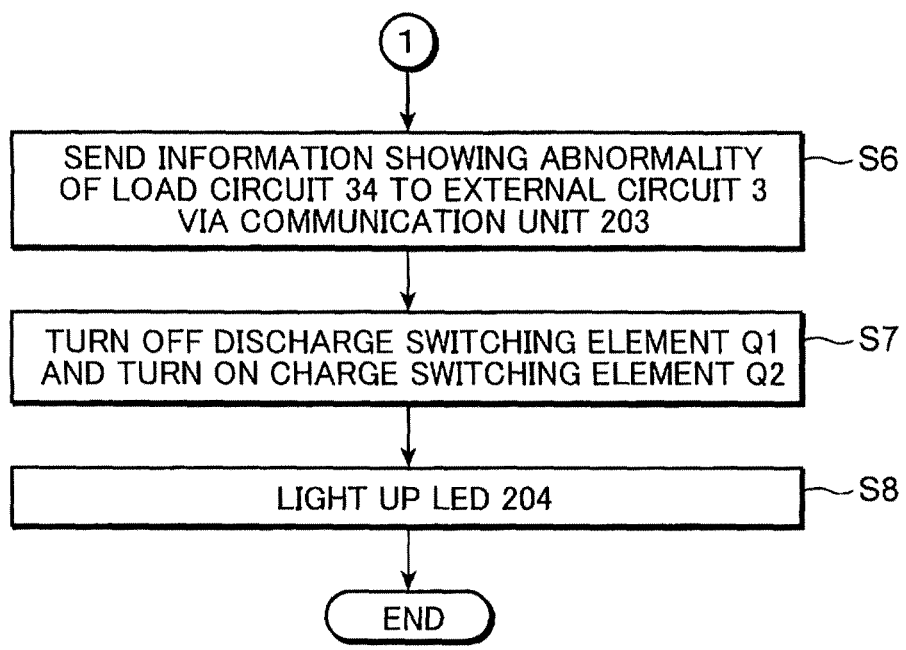
FIG. 6 is a flowchart showing an example of the operation of the protection circuit depicted in FIG. 1.
Figure 7:
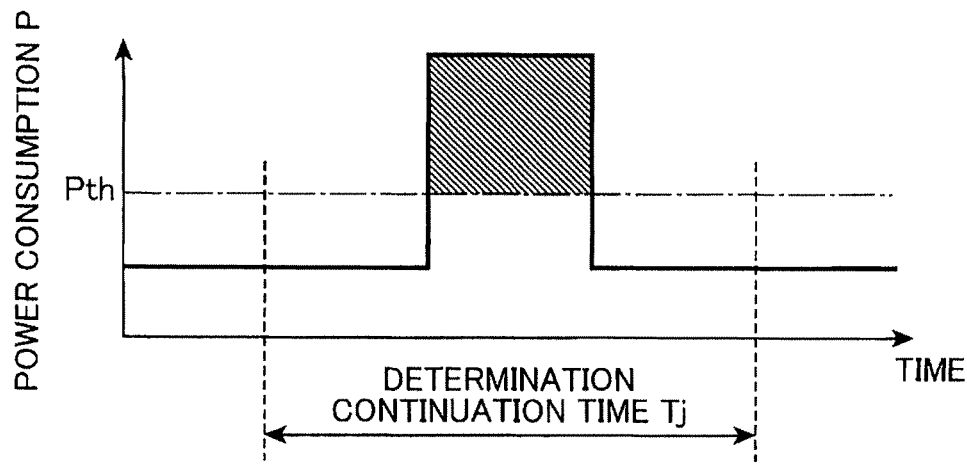
FIG. 7 is an explanatory diagram explaining an example of the operation of the protection circuit depicted in FIG. 5.
Figure 8:
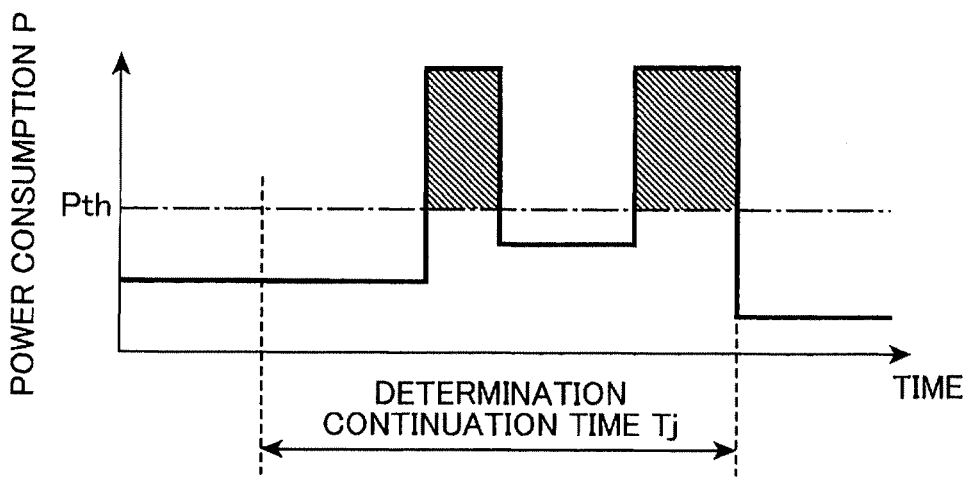
FIG. 8 is an explanatory diagram explaining an example of the operation of the protection circuit depicted in FIG. 5.
Figure 9:
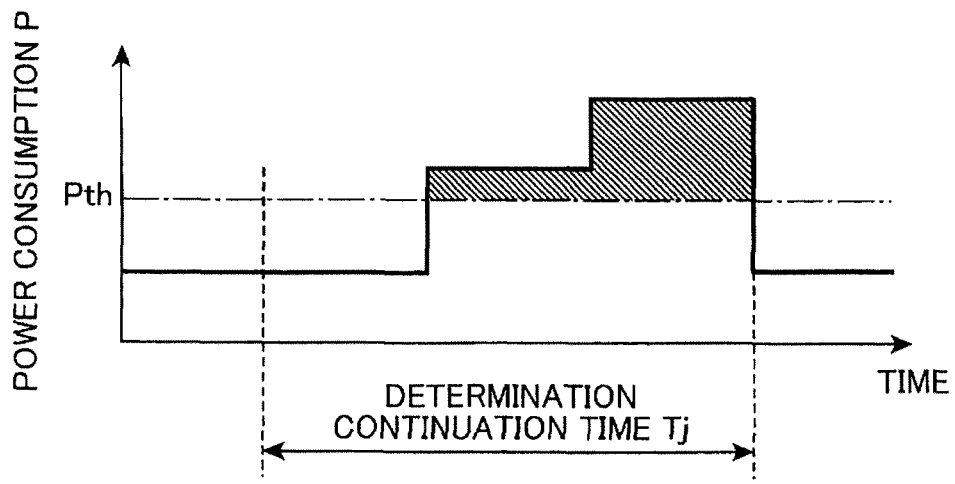
FIG. 9 is an explanatory diagram explaining an example of the operation of the protection circuit depicted in FIG. 5.
Figure 10:
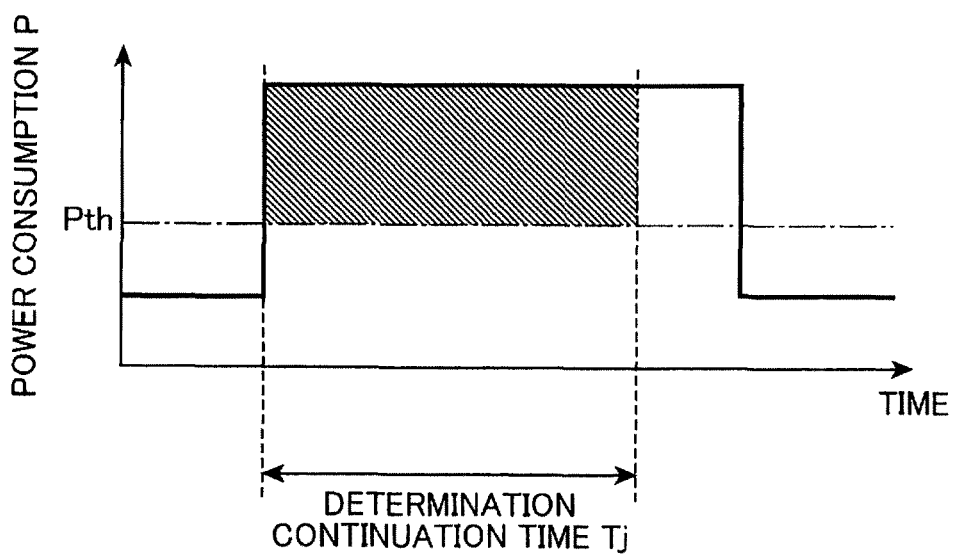
FIG. 10 is an explanatory diagram explaining an example of the operation of the protection circuit depicted in FIG. 5.

FIG. 5 and FIG. 6 are flowcharts showing an example of the operation of the protection circuit 4a shown in FIG. 1. In the following flowcharts, the same operation is given the same step number, and the explanation thereof is omitted. Moreover, steps S101 to S110 shown in FIG. 3 are executed in parallel with the flowcharts shown in FIG. 5 and FIG. 6.

Foremost, as with the protection circuit 4, steps S1 and S2 are executed. Subsequently, if the current flowing to the assembled battery 14 is in a discharging direction (YES at step S2), the external protection unit 212a starts timing the elapsed time T using, for example, a timer circuit not shown (step S10).

Subsequently, the external protection unit 212a initializes the excess power Po to zero (step S11). Next, the temperature t of the load circuit 34 is detected by the temperature sensor 38, and sent as temperature information with the control unit 37a and received by the communication unit 203. Subsequently, the temperature acquisition unit 221 acquires the temperature t of the load circuit 34 from the temperature information received with the communication unit 203 (step S12).

Subsequently, the threshold setting unit 222 sets the power threshold Pth so that the power threshold Pth becomes a smaller value as the temperature t rises (step S13).

Specifically, for example, an LUT (Look Up Table) which associates the temperature t and the power threshold Pth so that the power threshold Pth becomes a smaller value as the temperature t rises is stored in advance in the ROM. The power threshold Pth stored in the LUT in association with the temperature t acquired by the temperature acquisition unit 221 is thereby acquired with the threshold setting unit 222.

Subsequently, the terminal voltage detection unit 217 detects the terminal voltage Vt between the connecting terminals 11, 12 (step S3). Then, the power consumption calculation unit 211 multiplies the terminal voltage Vt and the charging/discharging current value Ic, and the absolute value thereof is calculated as the power consumption P (step S4).

Subsequently, the external protection unit 212a compares; for example, for each unit time, the power consumption P and the power threshold Pth (step S14). If the power consumption P is exceeding the power threshold Pth (YES at step S14), the external protection unit 212a sends the abnormality notification information showing that the power consumption P has exceed the power threshold Pth from the communication unit 203 to the communication unit 36 (step S15).

Then, in the external circuit 3a, the abnormality notification information is received by the communication unit 36 and output to the control unit 37a. When the control unit 37a thereby receives the abnormality notification information, for example, it is possible to control the operation of the load circuit 34 so as to reduce the power consumption of the load circuit 34, and maintain the temperature t of the load circuit 34 to be a specified temperature tmax or less.

Subsequently, the external protection unit 212a adds the difference between the power consumption P and the power threshold Pth to the excess power Po, the integration of the excess power Po is performed (step S16), and the routine proceeds to step S17.

Meanwhile, if the power consumption P is not exceeding the power threshold Pth (NO at step S14), the routine proceeds to step S17 without performing the integration of the excess power Po.

Subsequently, at step S17, the external protection unit 212a compares the elapsed time T and the determination continuation time Tj (step S17). If the elapsed time T is not exceeding the determination continuation time Tj (NO at step S17), steps S12 to S17 are repeated once again. Meanwhile, if the elapsed time T is exceeding the determination continuation time Tj (YES at step S17), the routine proceeds to step S18 since the determination continuation time Tj has lapsed.

FIG. 7, FIG. 8, FIG. 9, and FIG. 10 are explanatory diagrams explaining the operation of steps S10 to S17. In FIG. 7, FIG. 8, FIG. 9, and FIG. 10, the horizontal axis shows the time and the vertical axis shows the power consumption P. The area of the slanting lines in FIG. 7, FIG. 8, FIG. 9, and FIG. 10 show the excess power Po in the determination continuation time Tj.

Subsequently, at step S18, the external protection unit 212a compares the excess power Po and the determination threshold Poj (step S18). If the excess power Po is not exceeding the determination threshold Poj (NO at step S18), the external protection unit 212a determines that the external circuit 3 is normal, and steps S1 to S18 are repeated once again.

Meanwhile, if the excess power Po is exceeding the determination threshold Poj (YES at step S18), since it is considered that some kind of abnormality such as a short circuit malfunction has occurred in the load circuit 34, the external protection unit 212a executes the external protection processing (step S6 to S8).

According to the foregoing processing of steps S1 to S18, even if the power consumption P is exceeding the maximum power consumption Pmax, rather than instantaneously disabling the discharge of the assembled battery 14, since the external protection processing is executed when the excess power Po during the determination continuation time Tj exceeds the determination threshold Poj; that is, when the temperature t of the load circuit 34 may exceed the specified temperature tmax, it is possible to reduce the possibility of stopping the operation of the external circuit 3a unnecessarily due to the external protection processing.

Moreover, if the power consumption P is exceeding the power threshold Pth (YES at step S14), since the abnormality notification information is sent to the external circuit 3a at step S15, if the power consumption of the load circuit 34 can be reduced with the control unit 37a, it is possible to prevent the excess power Po from exceeding the determination threshold Poj and, therefore, it is possible to reduce the chance of stopping the operation of the external circuit 3a.

Note that the configuration may be such that step S15 is not executed. Moreover, the configuration may be such that the temperature acquisition unit 221 and the threshold setting unit 222 are not provided, and, without executing steps S12 and S13, a pre-set fixed value, for example, the maximum power consumption Pmax, may be used as the power threshold Pth.

Figure 11:
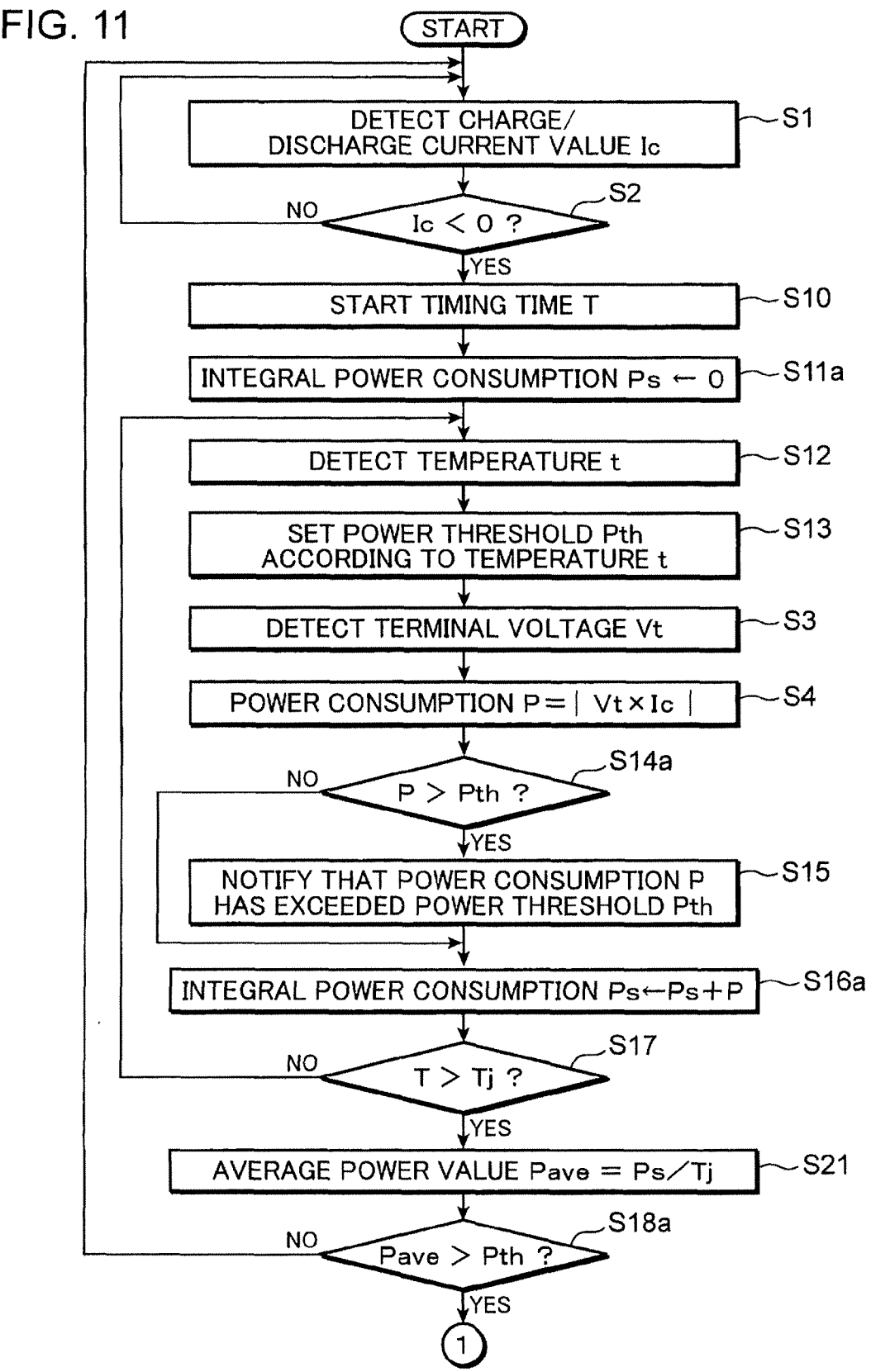
FIG. 11 is a flowchart showing a modified example of the operation of the protection circuit depicted in FIG. 5.

Moreover, as shown in FIG. 11, the external protection unit 212a may initialize the integral power consumption Ps to zero at step S11a, compare the power consumption P and the power threshold Pth, for example, for each unit time at step S14a, and, if the power consumption P is exceeding the power threshold Pth (YES at step S14a), proceed to step S15. Meanwhile, if the power consumption P is not exceeding the power threshold Pth (NO at step S14a), the external protection unit 212a may proceed to step S16a.

Subsequently, the external protection unit 212a may calculate the integral power consumption Ps by integrating the power consumption P at step S16a, and calculate the average power value Pave by dividing the integral power consumption Ps by the determination continuation time Tj at step S21.

Subsequently, the external protection unit 212a may compare the average power value Pave and the power threshold Pth at step S18a, and, if the average power value Pave is not exceeding the power threshold Pth (NO at step S18a), the external protection unit 212a determines that the external circuit 3 is normal and repeats steps S1 to S18a once again. Meanwhile, if the average power value Pave is exceeding the power threshold Pth (YES at step S18a), since it is considered that an abnormality such as a short circuit malfunction has occurred in the load circuit 34, the external protection unit 212a may execute the external protection processing (step S6 to S8).

Moreover, steps S101 to S110 shown in FIG. 3 are executed in parallel with the flowcharts shown in FIG. 11 and FIG. 6.

For example, if the load circuit 34 is a power unit such as a motor or a luminescent device such as a discharge lamp, there are cases where the power consumption in the load circuit 34 is converted into kinetic energy or optical energy without being converted into heat. If the power consumption is converted into kinetic energy or optical energy other than heat in the load circuit 34 as described above, it is considered that the portion of the power consumption P that is below the power threshold Pth will mostly be converted into energy other than heat and not contribute to the heat generation of the load circuit 34.

Accordingly, if the power consumption is converted into energy other than heat in the load circuit 34, the method of calculating the excess power Po by integrating only the portion of the power consumption P exceeding the power threshold Pth as with step S16 shown in FIG. 5, and determining whether to execute the external protection processing based on the excess power Po as shown in step S18 is able to improve the accuracy of reducing the possibility of the temperature t of the load circuit 34 exceeding the specified temperature tmax while reducing the possibility of the operation of the external circuit 3a being unnecessarily stopped due to the external protection processing.

Meanwhile, if the load circuit 34 is an information processing device such as a portable personal computer in which most of its power consumption ultimately becomes heat, the potion of the power consumption P below the power threshold Pth will also contribute to the heat generation of the load circuit 34.

Thus, if most of the power consumption of the load circuit 34 will ultimately become heat, the method of calculating the average power value Pave during the period of the determination continuation time Tj as with steps S16a and S21 shown in FIG. 11, and determining whether to execute the external protection processing based on the average power value Pave as shown in step S18a is able to improve the accuracy of reducing the possibility of the temperature t of the load circuit 34 exceeding the specified temperature tmax while reducing the possibility of the operation of the external circuit 3a being unnecessarily stopped due to the external protection processing.

Note that the operation examples shown in FIG. 5 and FIG. 11 can be applied regardless of the nature of the load circuit 34. Nevertheless, the operation example shown in FIG. 5 is more suitable than the operation example shown in FIG. 11 in the combination with a load circuit of a nature in which the power consumption is converted into energy other than heat, and the operation example shown in FIG. 11 is more suitable than the operation example shown in FIG. 5 in the combination with a load circuit of a nature in which most of the power consumption is converted into heat.

Figure 12:
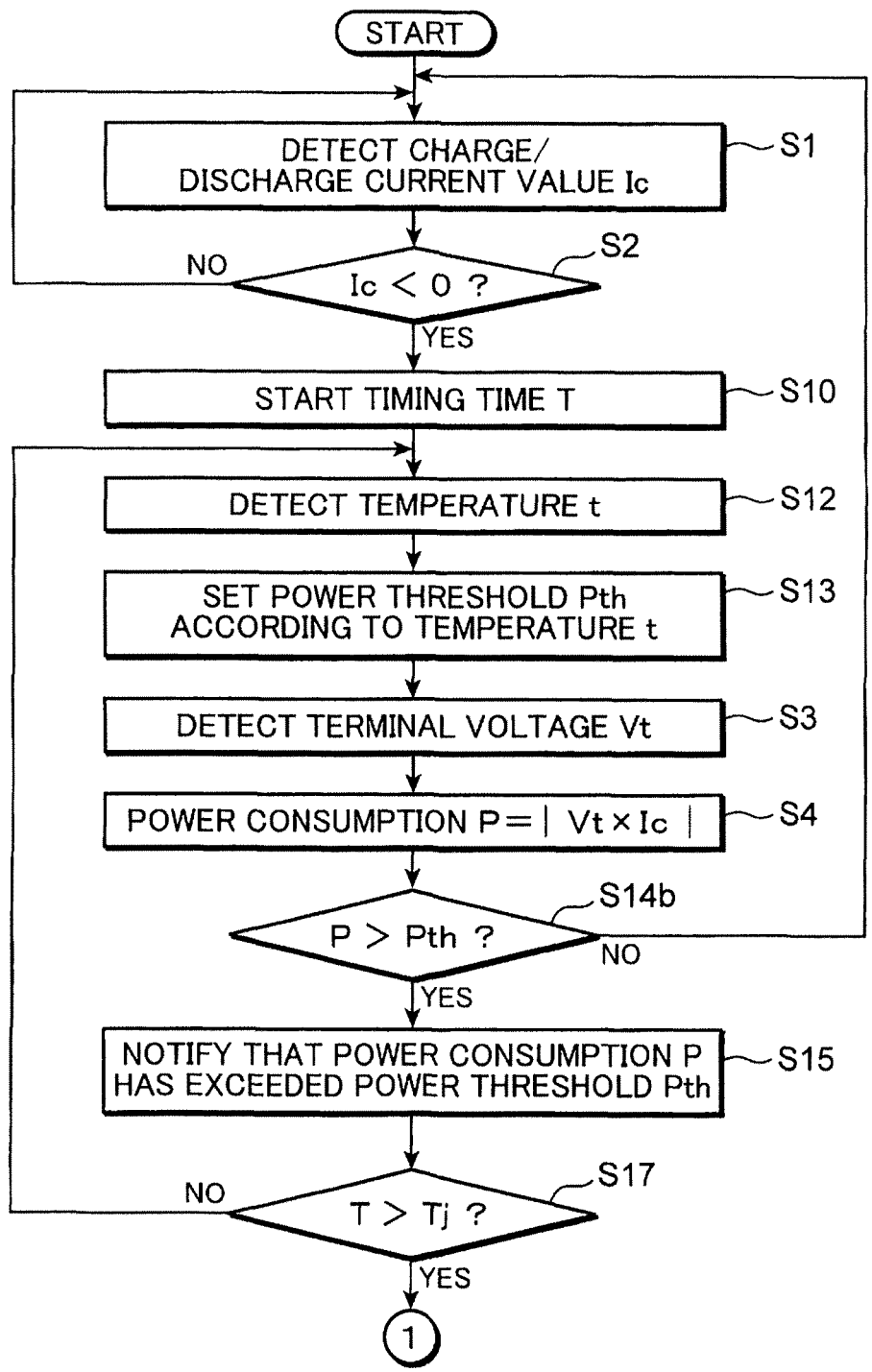
FIG. 12 is a flowchart showing a modified example of the operation of the protection circuit depicted in FIG. 5.

Note that, as shown in FIG. 12, it is also possible not to execute steps S11, S16, S18 in FIG. 5, and, if the power consumption P is not exceeding the power threshold Pth at step S14b (NO at step S14b), return to step S1 once again and repeat steps S1 to S14b, and, if the elapsed time T is exceeding the determination continuation time Tj at step S17 (YES at step S17), since this means that a state where the power consumption P is exceeding the power threshold Pth has continued during the determination continuation time Tj, proceed to step S6 upon determining than an abnormality has occurred in the external circuit 3a.

Steps S101 to S110 shown in FIG. 3 are executed in parallel with the flowcharts shown in FIG. 12 and FIG. 6.

In the foregoing case also, it is possible to reduce the possibility of the operation of the external circuit 3a being unnecessarily stopped due to the temporary increase of the power consumption P.

Specifically, the protection circuit according to one aspect of the present invention has: a connecting terminal which is connected to an external circuit and which inputs and outputs a charging/discharging current of a secondary battery to and from the external circuit; a voltage detection unit for detecting an output voltage of the secondary battery; a current detection unit for detecting a discharging current of the secondary battery; a power consumption calculation unit for calculating power consumption of the external circuit by multiplying a value of the output voltage detected by the voltage detection unit by a value of the discharging current detected by the current detection unit; and an external protection unit for executing external protection processing of protecting the external circuit when the power consumption calculated by the power consumption calculation unit exceeds a power threshold set to a value that is not less than a maximum value of the power consumption of the external circuit.

According to the foregoing configuration, the power consumption calculation unit calculates the power consumption of the external circuit by multiplying the value of the output voltage of the secondary battery and the value of the discharging current of the secondary battery. Subsequently, the external protection unit executes the external protection processing of protecting the external circuit if the power consumption calculated by the power consumption calculation unit exceeds the power threshold set to a value that is not less than the maximum value of power consumption of the external circuit; that is, if it is considered that some kind of abnormality occurred in the external circuit. Consequently, even in cases where an abnormality occurs in the power consumption of the load circuit, the load circuit can be protected regardless of the output voltage of the secondary battery even if the discharging current value is small due to the output voltage of the secondary battery being high.

Moreover, preferably, the protection circuit further has a switching unit for opening and closing a current path between the connecting terminal and the secondary battery, and the external protection processing includes processing for turning OFF the switching unit.

According to the foregoing configuration, since the switching unit is turned OFF with the external protection unit if the power consumption calculated by the power consumption calculation unit exceeds the power threshold set to a value that is not less than the maximum value of power consumption of the external circuit, the external circuit is protected as a result of the supply of current to the external circuit being blocked.

Moreover, preferably, the voltage detection unit detects a voltage of the connecting terminal as the output voltage.

If a switching unit is provided between the connecting terminal and the secondary battery, a difference will occur in cases where the output voltage of the secondary battery is detected with the terminal of the secondary battery and cases where it is detected with the connecting terminal due to the voltage drop that occurs in the switching unit. Accordingly, as a result of the voltage detection unit detecting the voltage of the connecting terminal as the output voltage and calculating the power consumption of the external circuit based on this voltage, the calculation accuracy of the power consumption of the external circuit can be improved.

Moreover, preferably, the protection circuit further has: a charge detection unit for detecting that a charging current has started to flow to the secondary battery; an output voltage value acquisition unit for acquiring, as an output voltage value of the external circuit, a voltage value of the connecting terminal detected by the voltage detection unit in a state where the switching unit is turned OFF when the charge detection unit detects that a charging current has started to flow to the secondary battery; and a battery protection unit for turning ON the switching unit when the output voltage value of the external circuit acquired by the output voltage value acquisition unit is less than a pre-set determination voltage, and maintaining a state where the switching unit is turned OFF when the output voltage value of the external circuit exceeds the determination voltage.

According to the foregoing configuration, the charge detection unit detects that a charging current has started to flow to the secondary battery; that is, that the charting of the secondary battery has started. Here, if the external circuit for applying the charging voltage to the connecting terminal is subject to some kind of abnormality such as a malfunction, there is a possibility that the secondary battery will deteriorate as a result of an overvoltage being applied thereto. Subsequently, since the output voltage value acquisition unit acquires, as the output voltage value of the external circuit, the voltage value of the connecting terminal detected by the voltage detection unit in a state of turning OFF the switching unit and eliminating the influence of the secondary battery, the voltage value to be output by the external circuit can be acquired, with high precision, as the output voltage value. Moreover, the battery protection unit turns ON the switching unit and charges the secondary battery if the output voltage value acquired by the output voltage value acquisition unit is less than the pre-set determination voltage; that is, if the secondary battery will not be charged with an overvoltage while it is being charged. Moreover, the battery protection unit is able to reduce the possibility of an overvoltage being applied to the secondary battery as a result of maintaining the state of turning OFF the switching unit if the output voltage value acquired by the output voltage value acquisition unit exceeds the determination voltage; that is, if there is a possibility that the secondary battery will be charged with an overvoltage.

In the foregoing case, since the voltage detection unit for detecting the voltage of the connecting terminal can be used as the voltage detection means for detecting the output voltage of the external circuit, there is no need to add a separate voltage detection circuit for detecting the output voltage of the external circuit. It is thereby possible to reduce costs that are required for protecting the secondary battery from being subject to the application of an overvoltage.

Moreover, preferably, the switching unit includes a charge switching element for blocking only a current in a charging direction of the secondary battery, and a discharge switching element which is connected to the charge switching element in series and which blocks only a current in a discharging direction of the secondary battery, the output voltage value acquisition unit acquires, as the output voltage value of the external circuit, a voltage value of the connecting terminal detected by the voltage detection unit in a state where the switching unit is turned OFF as a result of turning OFF the charge switching element and the discharge switching element when the charge detection unit detects that a charging current has started to flow to the secondary battery, and the battery protection unit turns ON the charge switching element and the discharge switching element when the output voltage value of the external circuit acquired by the output voltage value acquisition unit is less than the determination voltage, and establishes a charge disabled state of turning OFF the charge switching element and turning ON the discharge switching element when the output voltage value of the external circuit exceeds the determination voltage.

According to the foregoing configuration, the switching unit includes a charge switching element for blocking only a current in a charging direction of the secondary battery, and a discharge switching element which is connected to the charge switching element in series and which blocks only a current in a discharging direction of the secondary battery, and the battery protection unit turns ON the charge switching element and the discharge switching element to enable the charging/discharging of the secondary battery if the output voltage value acquired by the output voltage value acquisition unit is less than the determination voltage. Meanwhile, the battery protection unit turns OFF the charge switching element to protect the secondary battery from an overvoltage if the output voltage value acquired by the output voltage value acquisition unit exceeds the determination voltage, and enables the secondary battery to be discharged by turning ON the discharge switching element.

Moreover, preferably, the battery protection unit turns ON the charge switching element when the discharging current detection unit detects that a discharging current has flowed to the secondary battery during the charge disabled state.

According to the foregoing configuration, since the charge switching element is turned ON by the battery protection unit if the current detected by the current detection unit becomes a discharging direction of the secondary battery during the charge disabled state; that is, when there is no longer a possibility of an overvoltage being applied to the secondary battery, the secondary battery can be charged once again.

Moreover, preferably, the processing of turning OFF the switching unit included in the external protection processing is processing of turning OFF the discharge switching element while keeping the charge switching element turned ON, and, when the ON and OFF of the discharge switching element and the charge switching element by the external protection processing, the battery protection unit and the output voltage value acquisition unit are in conflict, the OFF operation prevails.

According to the foregoing configuration, since the discharge switching element is turned OFF while keeping the charge switching element turned ON if the power consumption exceeds the power threshold, the secondary battery can be charged while stopping the power supply to the load circuit.

Moreover, preferably, the external protection processing includes processing of sending information, which shows that an abnormality occurred in the external circuit, to the external circuit.

According to the foregoing configuration, since information showing that an abnormality has occurred in the external circuit is sent to the external circuit if the power consumption calculated by the power consumption calculation unit exceeds the power threshold set to a value that is not less than the maximum value of power consumption of the external circuit; that is, when is it is considered that some kind of abnormality has occurred in the external circuit, it is possible to execute processing of protecting the external circuit such as turning OFF the power or blocking the power supply to the abnormal location in the external circuit.

Moreover, preferably, the protection circuit further comprises an alarm unit for notifying that an abnormality has occurred in the external circuit when the power consumption calculated by the power consumption calculation unit exceeds the power threshold.

According to the foregoing configuration, it is possible to notify the user that an abnormality has occurred in the external circuit if the power consumption calculated by the power consumption calculation unit exceeds the power threshold.

Moreover, preferably, the external protection unit executes the external protection processing when a determination condition, in which a state where the power consumption calculated by the power consumption calculation unit exceeds the power threshold continues for a pre-set determination continuation time, is satisfied.

According to the foregoing configuration, even in cases where the power consumption temporarily exceeds the power threshold, since the external protection processing is not executed so as long as it does not continue for the determination continuation time, it is possible to reduce the possibility of inhibiting the operation of the external circuit due to unnecessary external protection processing.

Moreover, the external protection unit may also calculate excess power by integrating, during a pre-set determination continuation time, a difference between the power consumption and the power threshold when the power consumption calculated by the power consumption calculation unit exceeds the power threshold, and execute the external protection processing when a determination condition in which the excess power exceeds a pre-set determination threshold is satisfied.

According to the foregoing configuration, even in cases where the power consumption temporarily exceeds the power threshold, since the external protection processing is not executed if the excess power corresponding to the power of the portion of the power consumption that exceeded the power threshold during the determination continuation time does not exceed the determination threshold, it is possible to reduce the possibility of inhibiting the operation of the external circuit due to unnecessary external protection processing.

Moreover, the external protection unit may also calculate an average power value by time-averaging the power consumption calculated by the power consumption calculation unit for a pre-set determination continuation time, and execute the external protection processing when a determination condition in which the average power value exceeds the power threshold is satisfied.

According to the foregoing configuration, even in cases where the power consumption temporarily exceeds the power threshold, since the external protection processing is not executed if the average power value as the time-average value of the power consumption during the determination continuation time does not exceed the power threshold, it is possible to reduce the possibility of inhibiting the operation of the external circuit due to unnecessary external protection processing.

Moreover, preferably, the external protection unit further executes abnormality notification processing of sending abnormality notification information showing that the power consumption has exceeded the power threshold to the external circuit when the power consumption calculated by the power consumption calculation unit exceeds the power threshold, and executes the external protection processing when the determination condition is satisfied during the determination continuation time after the execution of the abnormality notification processing.

According to the foregoing configuration, since the abnormality notification information is sent to the external circuit when the power consumption exceeds the power threshold, the external circuit is able to perform control for reducing the power consumption and reducing the heating value. Its thereby possible to reduce the possibility of inhibiting the operation of the external circuit due to unnecessary external protection processing, while at the same time reduce the heating value based on control from the external circuit side. In addition, since the external protection processing is executed by the external protection unit if the determination condition is satisfied even during the determination continuation time after the abnormality notification information is sent, the external circuit can be protected even in cases where it is difficult to perform protection based on the control from the external circuit side.

Moreover, preferably, the protection circuit further comprises a temperature acquisition unit for acquiring temperature information which is information concerning the temperature of the external circuit, and a threshold setting unit for setting the power threshold so that the power threshold becomes a smaller value as the temperature indicated as the temperature information acquired by the temperature acquisition unit increases.

In the load circuit, the rise in temperature due to the heating value according to the power consumption is added on to the current temperature, and the temperature of the load circuit will increase. Thus, as a result of the threshold setting unit setting the power threshold so that the power threshold becomes a smaller value as the temperature rises, it is possible to set a power threshold which enables the temperature after the load circuit generates heat to be a constant temperature or less regardless of the current temperature.

Moreover, the protection circuit may further comprise a temperature acquisition unit for acquiring temperature information which is information concerning the temperature of the external circuit, and a threshold setting unit for setting the determination threshold so that the determination threshold becomes a smaller value as the temperature indicated as the temperature information acquired by the temperature acquisition unit increases.

According to the foregoing configuration, as a result of the threshold setting unit setting the determination threshold so that the determination threshold becomes a smaller value as the temperature rises, it is possible to set a determination threshold which enables the temperature after the load circuit generates heat to be a constant temperature or less regardless of the current temperature.

Moreover, the battery pack according to one aspect of the present invention comprises the foregoing protection circuit, and the secondary battery.

According to the foregoing configuration, if an abnormality occurs in the power consumption of the load circuit in the battery pack comprising the secondary battery, the load circuit can be protected regardless of the output voltage of the secondary battery.

With the protection circuit and the battery pack configured as described above, since the external protection unit executes the external protection processing for protecting the external circuit if the power consumption calculated by the power consumption calculation unit exceeds the power threshold set to a value that is not less than the maximum value of power consumption of the external circuit; that is, if it is considered that some kind of abnormality occurred in the external circuit, even in cases where an abnormality occurs in the power consumption of the load circuit, the load circuit can be protected regardless of the output voltage of the secondary battery.

This application claims priority to Japanese Patent Application No. 2009-094745, filed on Apr. 9, 2009, and Japanese Patent Application No. 2010-055559, filed on Mar. 12, 2010, the contents of which are hereby incorporated by reference into the present application.

Note that the specific embodiments and examples in the detailed description of the invention are merely provided for demonstrating the technical content of the present invention, and the present invention should not be interpreted narrowly by being limited to such specific examples. Thus, the present invention may be implemented in various modes within the spirit of this invention and the scope of claims provided below.

INDUSTRIAL APPLICABILITY

The protection circuit and the battery pack according to the present invention can be suitably used as a battery-mounted device or system of various electronic devices such as portable personal computers, digital cameras and cell phones, vehicles such as electrical vehicles and hybrid cars, and power systems that combine solar batteries and generators with secondary batteries.

The invention claimed is:

1. A protection circuit, comprising:
a connecting terminal which is connected to an external circuit and which inputs and outputs a charging and discharging current of a secondary battery to and from the external circuit;
a voltage detection unit for detecting an output voltage of the secondary battery;
a current detection unit for detecting the discharging current of the secondary battery;
a power consumption calculation unit for calculating power consumption of the external circuit by multiplying a value of the output voltage detected by the voltage detection unit by a value of the discharging current detected by the current detection unit;
a first communication unit for receiving a power threshold, which is set to a value that is not less than a maximum value of the power consumption of the external circuit, and is sent from a control unit of the external circuit via a second communication unit of the external circuit; and
an external protection unit for executing external protection processing of protecting the external circuit when the power consumption calculated by the power consumption calculation unit exceeds the power threshold received by the first communication unit.

2. The protection circuit according to claim 1, further comprising a switching unit for opening and closing a current path between the connecting terminal and the secondary battery,
wherein the external protection processing includes processing for turning OFF the switching unit.

3. The protection circuit according to claim 2, wherein the voltage detection unit detects a voltage of the connecting terminal as the output voltage.

4. The protection circuit according to claim 3, further comprising:
a charge detection unit for detecting that a charging current has started to flow to the secondary battery;
an output voltage value acquisition unit for acquiring, as an output voltage value of the external circuit, a voltage value of the connecting terminal detected by the voltage detection unit in a state where the switching unit is turned OFF when the charge detection unit detects that a charging current has started to flow to the secondary battery; and
a battery protection unit for turning ON the switching unit when the output voltage value of the external circuit acquired by the output voltage value acquisition unit is less than a pre-set determination voltage, and maintaining a state where the switching unit is turned OFF when the output voltage value of the external circuit exceeds the determination voltage.

5. The protection circuit according to claim 4, wherein the switching unit includes:
a charge switching element for blocking only a current in a charging direction of the secondary battery; and
a discharge switching element which is connected to the charge switching element in series and which blocks only a current in a discharging direction of the secondary battery,
the output voltage value acquisition unit acquires, as the output voltage value of the external circuit, a voltage value of the connecting terminal detected by the voltage detection unit in a state where the switching unit is turned OFF as a result of turning OFF the charge switching element and the discharge switching element when the charge detection unit detects that a charging current has started to flow to the secondary battery, and wherein
the battery protection unit turns ON the charge switching element and the discharge switching element when the output voltage value of the external circuit acquired by the output voltage value acquisition unit is less than the determination voltage, and establishes a charge disabled state of turning OFF the charge switching element and turning ON the discharge switching element when the output voltage value of the external circuit exceeds the determination voltage.

6. The protection circuit according to claim 5, wherein the battery protection unit turns ON the charge switching element when the discharging current detection unit detects that a discharging current has flowed to the secondary battery during the charge disabled state.

7. The protection circuit according to claim 5, wherein
the processing of turning OFF the switching unit included in the external protection processing is processing of turning OFF the discharge switching element while keeping the charge switching element turned ON, and
wherein when the ON and OFF of the discharge switching element and the charge switching element by the external protection processing, the battery protection unit and the output voltage value acquisition unit are in conflict, the OFF operation prevails.

8. The protection circuit according to claim 1, wherein the external protection processing includes processing of sending information, which shows that an abnormality occurred in the external circuit, to the external circuit.

9. The protection circuit according to claim 1, further comprising an alarm unit for notifying that an abnormality has occurred in the external circuit when the power consumption calculated by the power consumption calculation unit exceeds the power threshold.

10. The protection circuit according to claim 1, wherein the external protection unit executes the external protection processing when a determination condition, in which a state where the power consumption calculated by the power consumption calculation unit exceeds the power threshold continues for a pre-set determination continuation time, is satisfied.

11. The protection circuit according to claim 1, wherein the external protection unit calculates excess power by integrating, during a pre-set determination continuation time, a difference between the power consumption and the power threshold when the power consumption calculated by the power consumption calculation unit exceeds the power threshold, and executes the external protection processing when a determination condition in which the excess power exceeds a pre-set determination threshold is satisfied.

12. The protection circuit according to claim 1, wherein the external protection unit calculates an average power value by time-averaging the power consumption calculated by the power consumption calculation unit for a pre-set determination continuation time, and executes the external protection processing when a determination condition in which the average power value exceeds the power threshold is satisfied.

13. The protection circuit according to claim 10, wherein the external protection unit further executes abnormality notification processing of sending abnormality notification information showing that the power consumption has exceeded the power threshold to the external circuit when the power consumption calculated by the power consumption calculation unit exceeds the power threshold, and executes the external protection processing when the determination condition is satisfied during the determination continuation time after the execution of the abnormality notification processing.

14. The protection circuit according to claim 1, further comprising:
a temperature acquisition unit for acquiring temperature information which is information concerning a temperature of the external circuit; and
a threshold setting unit for setting the power threshold so that the power threshold becomes a smaller value as the temperature indicated as the temperature information acquired by the temperature acquisition unit increases.

15. The protection circuit according to claim 11, further comprising:
a temperature acquisition unit for acquiring temperature information which is information concerning the temperature of the external circuit; and
a threshold setting unit for setting the determination threshold so that the determination threshold becomes a smaller value as the temperature indicated as the temperature information acquired by the temperature acquisition unit increases.

16. A battery pack, comprising:
the protection circuit according to claim 1; and
the secondary battery.

17. A protection circuit, comprising:
a connecting terminal which is connected to an external circuit and which inputs and outputs a charging and discharging current of a secondary battery to and from the external circuit;
a voltage detection unit for detecting an output voltage of the secondary battery;
a current detection unit for detecting the discharging current of the secondary battery;
a power consumption calculation unit for calculating power consumption of the external circuit by multiplying a value of the output voltage detected by the voltage detection unit by a value of the discharging current detected by the current detection unit; and
an external protection unit for executing external protection processing of protecting the external circuit when the power consumption calculated by the power consumption calculation unit exceeds a power threshold set to a value that is not less than a maximum value of the power consumption of the external circuit,
wherein the external protection unit stores the power threshold in advance.

18. A battery pack, comprising:
the protection circuit according to claim 17; and
the secondary battery.

* * * * *